United States Patent [19]
Dommety et al.

[11] Patent Number: 6,151,319
[45] Date of Patent: Nov. 21, 2000

[54] CONNECTIONLESS MESSAGE SERVICE USING ATM ROUTERS

[75] Inventors: Gopal Dommety, Columbus, Ohio; Pramod Pancha, Somerset; Malathi Veeraraghavan, Atlantic Highlands, both of N.J.

[73] Assignee: Lucent Technologies Inc., Murray Hill, N.J.

[21] Appl. No.: 08/769,962

[22] Filed: Dec. 19, 1996

Related U.S. Application Data

[60] Provisional application No. 60/031,001, Nov. 15, 1996.

[51] Int. Cl.$^7$ .................................................. H04L 12/66
[52] U.S. Cl. ............................ 370/395; 370/401; 370/397
[58] Field of Search .................................. 370/401, 352, 370/395, 396, 397, 398, 399, 389, 466, 467, 473, 474, 475, 353; 455/403

[56] References Cited

U.S. PATENT DOCUMENTS

| | | | |
|---|---|---|---|
| 5,732,078 | 3/1998 | Arango | 370/401 |
| 5,748,626 | 5/1998 | Esaki et al. | 370/466 |
| 5,958,018 | 9/1999 | Eng et al. | 455/403 |

Primary Examiner—Huy D. Vu
Attorney, Agent, or Firm—Frederick B. Luludis

[57] ABSTRACT

A facility is provided in which an ATM switch may operate as a switch in the provision of connection oriented services and operates as a router in the provision of connectionless services. In the router mode, the ATM switch may determine "on the fly" a route which may be used to forward received data cells to an intended destination and then forwards each of the data cells in sequence over the determined route. In the switch mode, the ATM switch operates conventionally and forwards a received data cell over a previously defined switched virtual path. In certain cases, the ATM switch may operate as a router only.

19 Claims, 6 Drawing Sheets

CONNECTIONLESS MESSAGE SERVICE USING ATM ROUTERS

This application claims the priority date of the corresponding provisional application No. 60/031,001 filed Nov. 15, 1996.

FIELD OF THE INVENTION

The invention relates to transporting a datagram via Asynchronous Transport Mode (ATM) routers using a connectionless message service.

BACKGROUND OF THE INVENTION

In an ATM network, a message is transported from a source to a receiver via a virtual circuit. The virtual circuit is activated whenever the source sends a message to the receiver. Such a circuit is established using a so-called connection oriented service that is invoked when the source initially enters a request to send data to the receiver. The ATM switch serving the source responds to the request by first consulting a routing table that identifies an output path that may be used to forward a call set-up message to the ATM switch serving the receiver and then transmitting the message over that path. It can be appreciated that the call set-up message may be processed by one or more intermediate ATM switches before it actually reaches the destination ATM switch. Each ATM switch that receives the call set-up message establishes a virtual connection through its switching fabric to an output path extending to the next switch that will form the virtual connection and sends the call set-up message thereto. The origination ATM switch thereafter activates the established virtual connection when it transmits a cell containing a virtual path identifier and virtual circuit identifier which uniquely identify a segment of the virtual circuit connection extending to either the destination switch or a next intermediate switch.

It can be appreciated from the foregoing that establishing a virtual connection is somewhat cumbersome and is typically done regardless of the amount of data that a source sends to a receiver. That is, a virtual connection is established even when the data that needs to sent to a receiver can fit into a short datagram flow, e.g., a relatively small number of data packets.

SUMMARY OF THE INVENTION

An advance in the relevant art is achieved, in accordance with the invention, by transporting a short datagram (e.g., an electronic mail message) directly to a destination on the "fly" using what we call an ATM router. In this sense, then, the datagram is transported over the network to the destination as though it were a call set-up message.

Thus, in accordance with one embodiment of the invention, an ATM switch operates as a switch in the provision of connection oriented services and operates as a router in the provision of connectionless services. In such an embodiment, an ATM switch, responsive to receiving a data packet from a source, segments the data packet into ATM data cells and appends a header to each such data cell. Then, responsive to a presence of a first indication indicative of connectionless service, the switch operates as a router by determining a route which may be used to forward each of the data cells to an intended destination and forwards each of the data cells in sequence over the determined route. However, if the particular indication is absent, then switch operates conventionally and forwards each of the data cells in sequence over a previously defined switched virtual circuit.

These and other aspects of the invention will become more apparent from the following detailed description considered in conjunction with the accompanying drawings.

BRIEF DESCRIPTION OF THE DRAWING

In the FIGS.

DETAILED DESCRIPTION

Figures 1, 2:
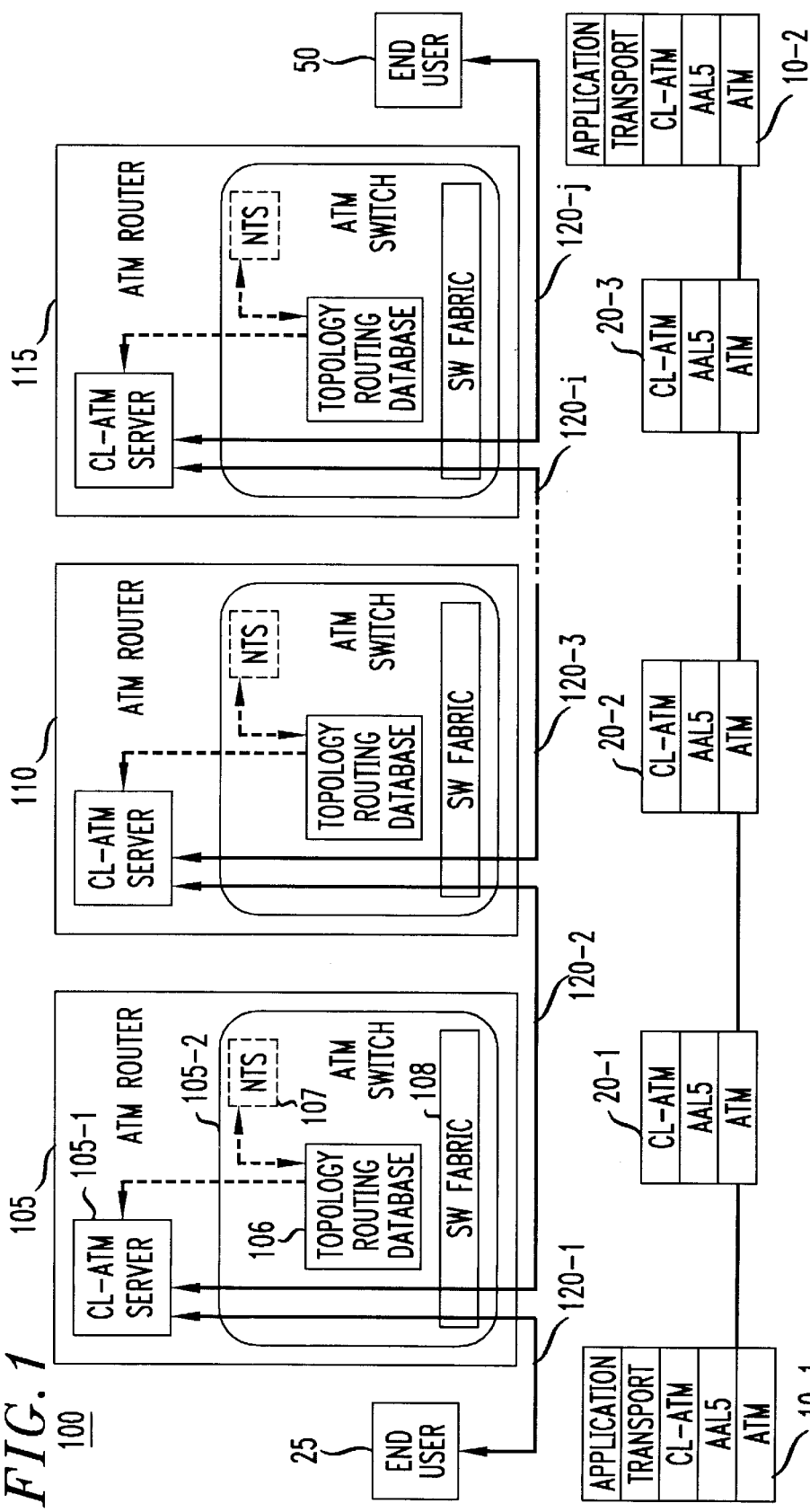
FIG. 1 illustrates in block diagram form an ATM network arranged in accordance with the principles of the invention.
FIG. 2 is an illustrative example of a data packet that is formed at the CL-ATM layer of the protocol stack that is implemented in an end user.

Turning to FIG. 1, ATM network 100 comprises a plurality of ATM switches, three of which are shown in the FIG., namely ATM switches 105, 110, and 115. Each such switch is arranged to provide conventional connection oriented services as well as connectionless services, in which case, an ATM switch performs a switching function in the provisioning of the former service and performs a router function in the provisioning of the latter service, all in accordance with the principles of the invention. As shown, an ATM switch/router includes various circuitry and software comprising, e.g., topology/routing database 106, network topology software (NTS) 107 and ATM switch fabric 108, for implementing conventional ATM switching functions, and also includes CL-ATM (ConnectionLess-ATM) server 105-1 for implementing a router function. More particularly, server 105-1 causes the associated switch to operate as an ATM router rather than as a switch.

(It is noted that the discussion pertaining to ATM switch/router 105 equally pertains to all of the ATM routers forming network 100, namely, ATM switch/router 110 and 115.)

NT Software 107, more particularly, causes an ATM controller (not shown) to periodically exchange network topology information with its neighboring nodes (ATM switches). The exchange of topology information may be done in accordance with the protocol disclosed in the ATM forum standard entitled "Private Network-Network Interface Specification v1.0 (PNNI 1.0)", published by the ATM Forum Technical Committee, March 1996, as publication af-pnni-0055.000, which is hereby incorporated by reference. The topology information may also include data indicating the level of congestion at the ATM nodes. A node/ATM switch accumulates such information and uses it to construct a table defining the topology of the associated network including the links interconnecting the ATM switches forming the network. NT software 107 stores such information and the resulting topology table (as well as traffic congestion levels, if any) in topology database 106. CL-ATM server 105-1 uses the topology information stored in database 106 to determine the shortest path (route) from its associated ATM switch to a destination point, e.g., end user 50, in the delivery of a connectionless message to that destination. In doing so CL-ATM server 105-1 invokes particular software that implements the well-known Dijkstra algorithm that is used to determine the shortest path to the identified destination.

The ATM routers 105, 110 and 115 each process a received connectionless message in accordance with the same protocol stack designated in the FIG. as 20-i. Whereas end users 25 and 50 process a connectionless message in accordance with another protocol stack designated 10-i, as will be explained below. An end user, e.g., end user 25, which may be, for example, a host computer, ATM switch, data terminal, etc., may be either the originator or receiver of a connectionless message. Specifically, assume that end user 25 receives data from an associated data source/application for delivery to end user 50, in which the data is accompanied by a delivery flag indicating whether the packet is to be transported via connection oriented service or connectionless service. That is, assume that if the delivery flag is set then the data will be sent via connection oriented service. The setting of the delivery flag may be done in those instances where the data payload is large or where a series of related frames of data is being sent to the identified destination. In that instance, the data may be transported to the identified destination via conventional connection oriented service.

If, on the other hand, the delivery flag is not set, then the application supplies the data to software implementing the CL-ATM layer of protocol stack 10-1 that is implemented in end user 25. The CL-ATM layer of stack 10-1, in turn, forms the data and destination address into a data packet. An illustrative example of the format of such a data packet is illustrated in FIG. 2. The data packet, more particularly includes, inter alia, fields 201 and 202 respectively identifying source and destination ATM NSAP (Network Service Access Point) addresses. It also includes (a) optional source route field 203 that an ATM router may use to specify a particular route for the delivery of the data packet to the destination identified in field 202 as will be discussed below, (b) optional flow label field 204 that may be used to indicate that the packet is associated with a particular group of packets (c) other fields designated 205. The packet also includes a variable length payload field 206.

It is seen from FIG. 1 that protocol stack 10-1 includes a transport layer, which may be used to implement a conventional TCP protocol. That is, if the application layer wants the data to be handled in accordance with conventional TCP control functions (e.g., error detection and sequencing control functions) then it supplies the data and destination address to the transport layer. The latter layer generates and appends a conventional TCP header to the data and passes the result to the associated CL-ATM layer, which then forms the result into a data packet, as mentioned above. The CL-ATM layer then supplies the packet to a conventional ATM Adaptation Layer 5 (AAL5) in stack 10-1. The CL-ATM layer of stack 10-1 also passes to the AAL5 layer a unique Virtual Path Identifier (VPI) and Virtual Circuit Identifier (VCI) which, in accordance with the invention, are used to identify connectionless service that will be used to transport the cells over network 100.

The AAL5 layer of stack 10-1, which may be implemented using an AAL5 processor such as the so-called ATM-IZER circuit available from Brooktree Corp. of San Diego, Calif., processes a data packet of any length by computing an eight byte trailer comprising a CRC code, payload length indicator, user-to-user information field, etc., and appending the trailer to the packet as well as any padding needed to make the total length of the resulting packet some multiple of 48 bytes. The AAL5 processor then segments the resulting packet into a number of payloads each comprising 48 bytes. The AAL5 processor then appends a conventional ATM header to each such payload to form a conventional ATM cell, in which the header includes, inter alia, the common VP and VC identifiers, e.g., a VPI of 16 and a VCI of 0. The AAL5 layer of stack 10-1 then supplies each such cell in sequence to a conventional ATM physical layer of stack 10-1. The latter layer then transmits the cell to ATM switch/router 105 via transmission path 120-1.

ATM switch/router 105 (as well as ATM switch/router 110 and 115) functions conventionally as a switch with respect to ATM cells that are to be transported via respective switched virtual circuits. Alternatively, it operates as a router with respect to ATM cells that are to be transported via connectionless service, as mentioned above. Accordingly, then when router 105 receives an ATM cell at the physical ATM layer of protocol stack 20-1 it checks the VP and VC identifiers contained in the header of the cell. If those identifiers correspond to the aforementioned common identifiers, then the latter ATM router concludes that the cell is to be accorded connectionless service and passes the cell up to the AAL5 layer of protocol stack 20-1. The AAL5 layer stores the cell in a data buffer and also stores the remaining cells defining the aforementioned data packet in the data buffer as they are received. When all such cells have been stored in the data buffer, then the AAL5 layer of stack 20-1 reassembles the data packet originally formed by the CL-ATM layer of stack 10-1 and passes the reassembled data packet to the CL-ATM layer of stack 20-1 which may be implemented in CL-ATM server 105-1.

CL-ATM server 105-1 processes the packet similar to the way that a conventional router processes a received packet. In particular, CL-ATM server 105-1 invokes software implementing the aforementioned Dijkstra algorithm to determine the shortest route from ATM router 105 to the destination identified in the reassembled data packet, in which the Dijkstra algorithm uses the topology table stored in topology/routing database 106 to make that determination. When the algorithm completes that determination, then server 105-1 may load the result in optional field 203 (FIG. 2) and then passes to its associated stack AAL5 layer the reassembled data packet, common VP and VC identifiers and an output port address identifying a path connecting to the next ATM router identified as an element in the shortest route/path to the destination. The AAL5 layer segments the data packet into cells in the manner discussed above for AAL5 layer of stack 10-1 and supplies each such cell in turn to the associated ATM physical layer for transmission via the identified output port. (It is noted that, as will be pointed out below, if optional field 203 is not being used then each ATM router that processes the data packet will determine for itself the shortest route for delivering the packet to its destination. Otherwise, an ATM router routes the packet in accordance with the route that is specified in field 203.)

Assuming that the next router is ATM router 110, then ATM router 110 processes the cells similar to the way they were processed by ATM router 105. Thus, in accordance with protocol stack 20-2 (which is similar to stack 20-1) ATM router 110 outputs the cells forming the original data packet to its output port connected via transmission path 120-3 to the next router identified in packet field 203, as mentioned above. It is seen from FIG. 1 that transmission path 120-3 leads to a dashed section, which is used to indicate the possibility that the cells outputted to path 120-3 may flow through one or more other ATM routers (not shown) which similarly process received ATM cells carrying the aforementioned common VP and VC identifiers in their respective headers. The last of such ATM routers would then supply the ATM cells to ATM router 115 via transmission path 120-i as specified by the contents of packet field 203. ATM router 115 will then process the ATM cells in a similar manner. However, in this instance, the CL-ATM server of ATM router 115 recognizes that end user 50 is the destination of the data packet that was originally launched by the application running in end user 25. The CL-ATM layer of stack 20-3 thus supplies the data packet that it reassembles from the incoming data cells to transmission path 120-j via its associated AAL5 and ATM physical layers. End user 50 connected to path 120-j receives ATM cells via its ATM physical layer of protocol stack 10-2 and supplies the cells as they are received to the associated AAL5 layer. The latter AAL5 layer, in the manner discussed above, stores the ATM cells as they are received in a data buffer and, responsive to storing the last of the associated cells in the buffer, reassembles them into the aforementioned data packet and supplies the result to its associated CL-ATM layer software. CL-ATM layer of stack 10-2 depacketizes the data and supplies the payload and origination address to the application running on end user 50. If, in processing the packet, the CL-ATM layer at end user 50 finds that a TCP header is appended to the data, then the data is supplied to the transport layer of stack 10-2. The transport layer then processes the data in a conventional manner. If the transport layer as a result of such processing finds that the data does not contain errors, then it passes the data to the application running end user 50. Otherwise, the transport layer may attempt to correct any errors contained in the data, e.g., using error correction codes accompanying the data, and supplies the corrected result to the latter application. If the errors cannot be corrected, then the transport layer does not return a conventional acknowledgment to the transport layer associated with the origination point of the received packet. The failure to receive such an acknowledgment should cause the origination point, e.g., end user 25, to retransmit the data.

Figure 3:
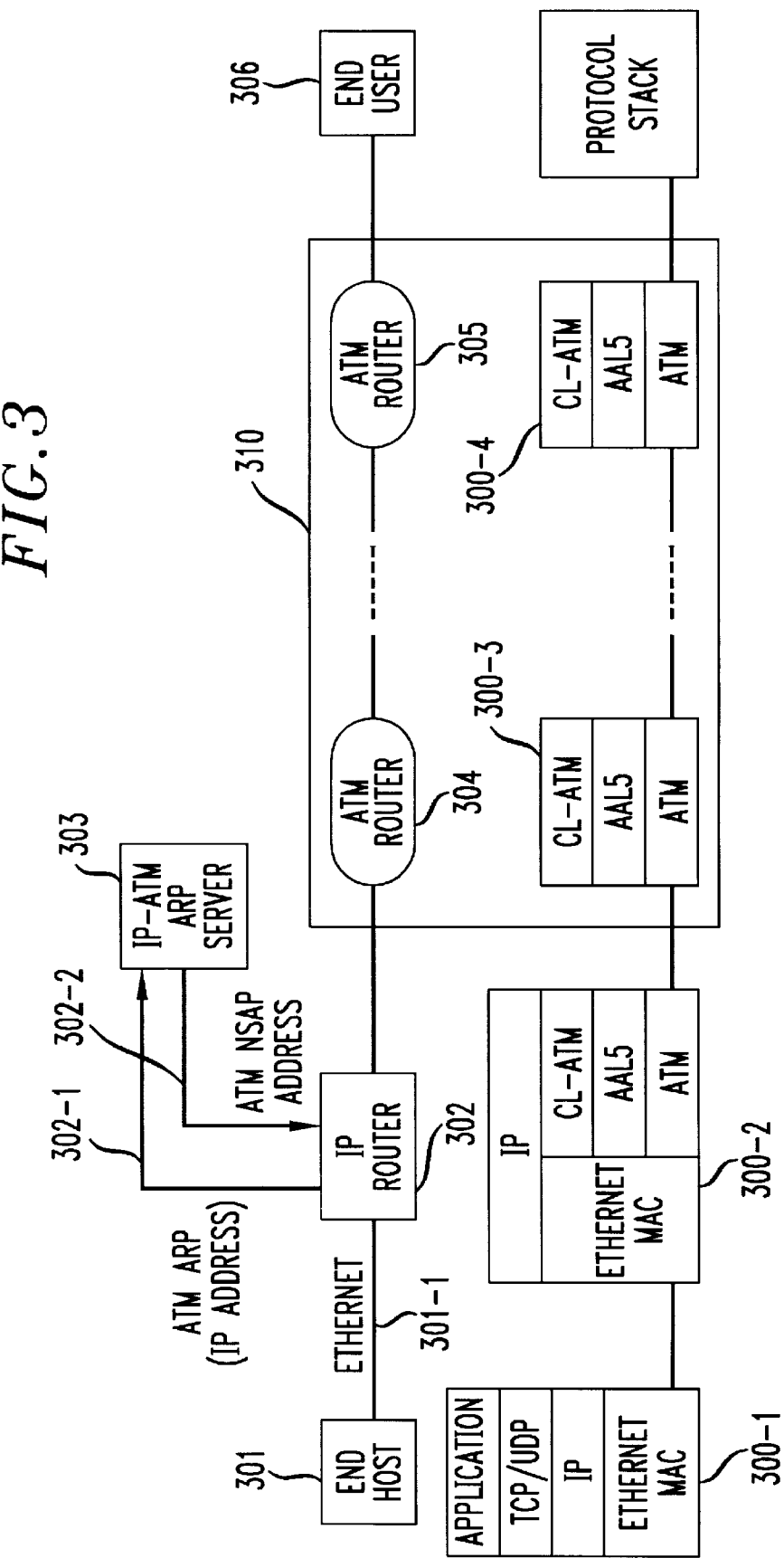
FIGS. 3 and 4 are illustrative examples of transporting Internet traffic from a web site to an end user over an ATM network in accordance with the principles of the invention.

The novel connectionless service described above may be readily used in a number of different applications to achieve an advantage in the routing of data via an ATM network from one end user, e.g., an Internet web site, to another end user, e.g., a data terminal such as a personal computer. Referring then to FIG. 3, it is assumed that the application process of conventional protocol stack 300-1 (which is running on end host 301 that serves as an Internet web site) has received a request from an end user, e.g., end user 306, for particular data, e.g., a web page associated with site 301. To respond to the request, host/web site 301 supplies the data forming its web page to the transmission control protocol (TCP) layer of protocol stack 300-1. (Alternatively, a conventional UDP protocol layer may be used in place of place of the TCP protocol layer.) Conventional TCP layer, in turn, forms the data into packets and supplies each such packet as it is formed to the conventional IP layer of stack 300-1. The IP layer, in turn, appends a conventional Internet IP address identifying the destination that is to receive the packet. The IP layer then passes the resulting data packet to the physical layer, herein assumed to be the well-known Ethernet MAC layer which forms an Ethernet frame from such packets and which then adds a MAC header to the packet, in which the header includes, inter alia, a MAC address identifying the destination of the frame. The Ethernet MAC layer then transmits the frame over Ethernet bus 301-1 to conventional IP router 302 which processes received frames in accordance with conventional protocol stack 300-2. The Ethernet MAC physical layer of stack 300-2 provides an interface between Ethernet 301-1 and IP router 302 for the purpose of receiving MAC frames via bus 301-1. Upon receipt of a MAC frame, the MAC layer of stack 300-2 removes the MAC header from the frame and passes the result to the IP layer of stack 300-2. The IP layer, in turn, reassembles the IP packet from the MAC frame and then sends a copy of the IP address in the packet to IP-ATM ARP server 303 via path 302-1. IP-ATM ARP server 303, e.g., a Pentium based computer, translates the IP address into an ATM NSAP (Network Service Access Point) address for the destination and returns that address to the IP layer via path 302-2, all in accord with an aspect of the invention. The IP layer of stack 300-2 then supplies the packet payload and ATM NSAP address of the destination to the CL-ATM layer of stack 302. The latter layer as well as the AAL5 and ATM layers of stack 300-2 operate in the manner discussed above to process and route the data to the destination 306 via ATM network 310. Similarly, ATM routers 304 and 305 and their respective protocol stacks 300-3 and 300-4 operate in the manner discussed above and thus deliver the packet to its intended destination using connectionless service. (It is noted that if the end host 301 has an ATM interface then it could directly generate the address resolution request to the IP-ATM ARP server 303.)

Figure 4:
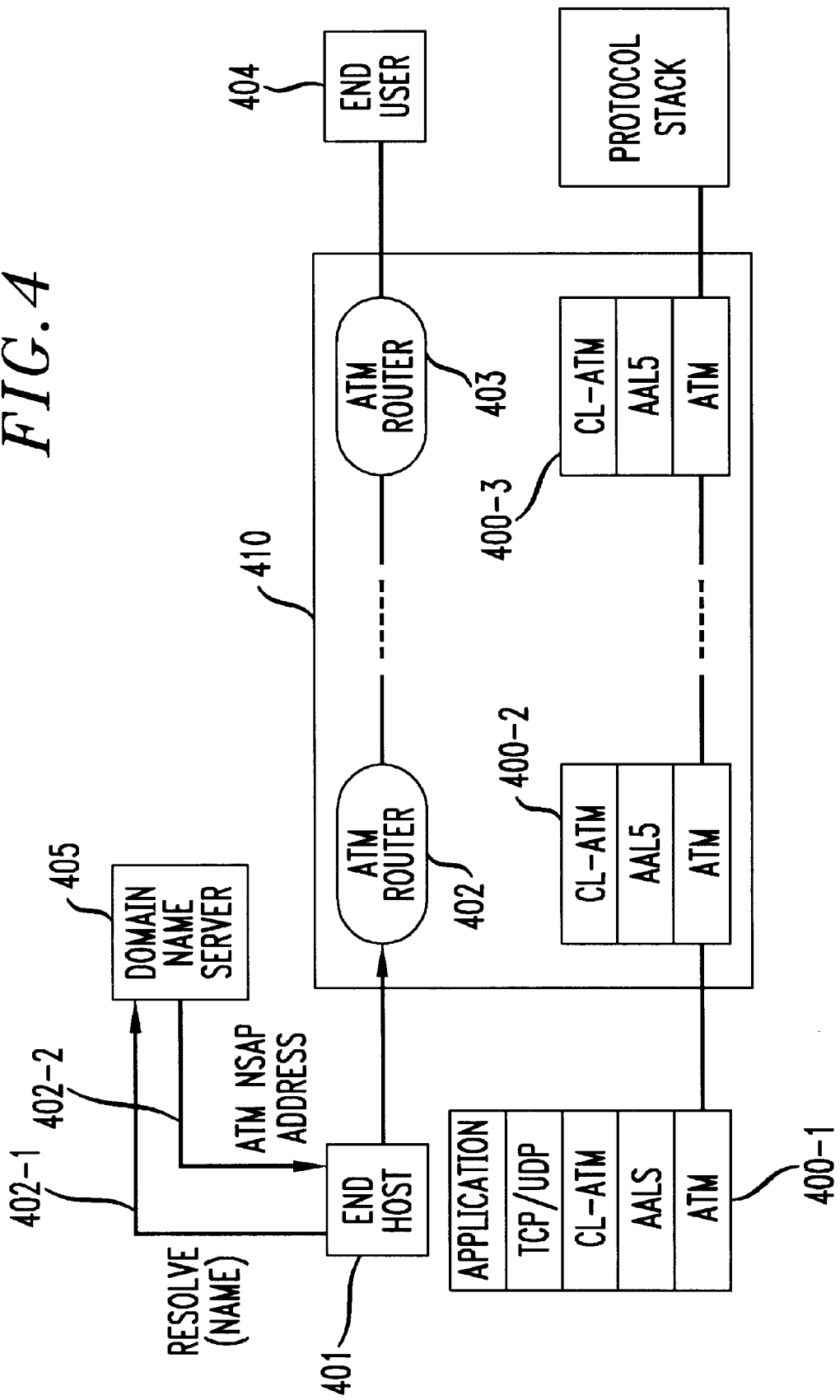

An alternative embodiment of the above application of transmitting IP over an ATM network is shown in FIG. 4, in which the protocol stack running in end host 401 is arranged in accord with an aspect of the invention. Specifically, assume that host 401 has received a request for particular data, e.g., a web page, from end user 404 and the application layer of protocol stack 400-1 will supply the requested data. Also assume that the request contains a host name rather then a destination IP address. In that case, then, the application layer of stack 400-1 supplies the name to host name server 405 via path 402-2. Server 405, e.g., a Pentium based computer, translates a host name that it receives into a corresponding ATM NSAP address and returns the address over path 402-2. It then passes the data defining the web page as well as the ATM NSAP address to the TCP (or UDP) layer of stack 400-1. Similarly, the TCP (UDP) layer forms the data into packets, and then supplies each such packet as it is formed to the CL-ATM layer of stack 400-1 with the ATM NSAP address. The CL-ATM layer of stack 400-1 formats the CL-ATM packet as shown in FIG. 2. It then passes the received address and packet to AAL5 layer of stack 400-1, in the manner discussed above. The AAL5 layer then converts that information into ATM cells and passes each cell, in turn, to the ATM layer of stack 400-1 for transmission to the destination, e.g., end user 404, via ATM network 410. Similarly, ATM routers 402 and 403 and their respective protocol stacks 400-2 and 400-3 operate in the manner discussed above and thus deliver the packet to its intended destination, in accordance with an aspect of the invention, namely, transporting Internet traffic via connectionless service over an ATM network.

Figure 5:
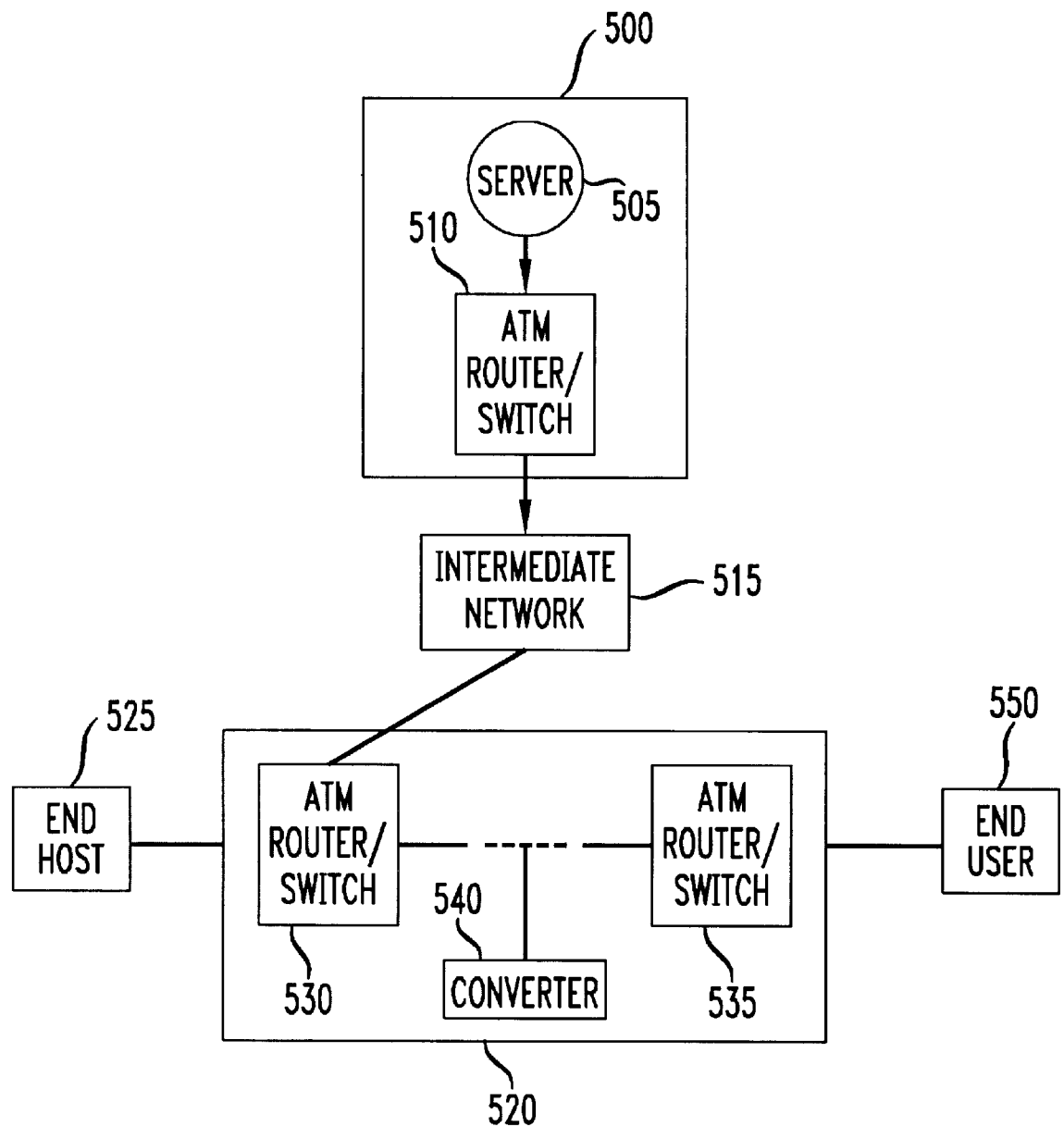
FIG. 5 is an illustrative example of transporting in accordance with the principles of the invention a so-called third party call set-up message over an ATM network for the purpose of setting up a connection between two end points via the ATM network.

The novel connectionless service may also be used to set up a third party call connection in an ATM network, as is illustrated in FIG. 5. Specifically, assume that server 505 associated with network 500 has a need to set up a call connection between end host 525 and end user 550 via ATM network 520. Server 505 may do so by forwarding the set-up message to ATM router/switch 510, which then processes the message in accordance with the principles of the invention, that is, router 510 forwards the message toward its destination, e.g., end host 525, using the novel connectionless service. Assume that intermediate ATM network 515 is also arranged in accordance with the principles of the invention and, as such, routes the call set-up message as a connectionless message to ATM router/switch 530 of network 520. Router/switch 530, in turn, routes the message to its destination, which is assumed to be end host 525. upon receipt of the message, end host 525 sends a call set-up request message to router/switch 530 to establish a connection from host 525 to end user 550. Responsive to receipt of the request, switch 530 establishes a virtual connection between host 525 and end user 550 via network 520 and ATM router/switch 535. End host 525 then sends a message via connectionless service to server 505 to indicate that the connection has been established.

As another example of third-party call set up in an ATM network, assume that host 525 and end user 550 have different application-layer interfaces—which means that some sort of conversion needs to be disposed in the virtual connection interconnecting end host 525 and end user 550. Assume that the host interface is MPEG based and that the end user interface is JPEG based. For that case then, a MPEG protocol to JPEG protocol converter would be disposed between the two end points. This may be done from server 505 by sending to host 525 via connectionless service a request to set up a connection to converter 540 and also sending a similar message to user 550, in which each message would be transported in the manner discussed above. Upon receipt of the request at end host 525 (end user 550), a call set up message would be sent to ATM router/switch 520 (535) requesting a connection to converter 540. ATM router/switch 520 (535), in turn, would establish the requested connection. At that point, end host 525 and end user 550 may communicate with each other via converter 540.

Figure 6:
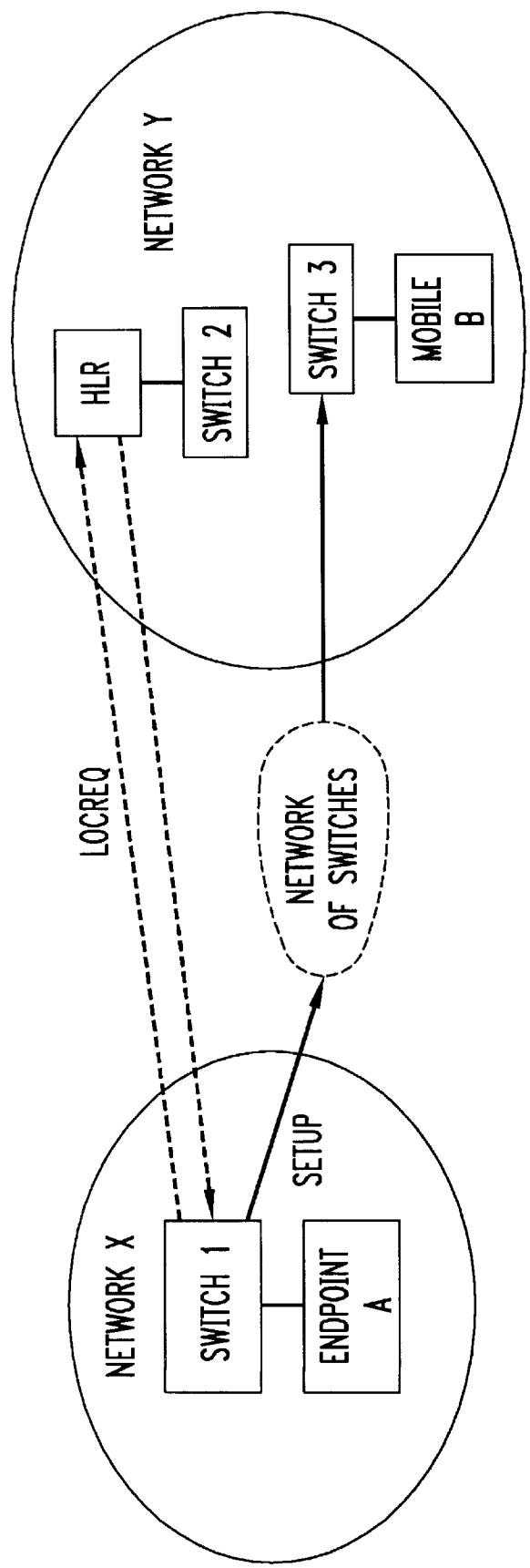
FIG. 6 illustrates an example of determining, in accordance with an aspect of the invention, the current location of a wireless mobile station.

Another application that highlights the need for facilitating datagrambased communications is mobile location in ATM networks. One approach to locating a mobile before connection setup is to use the cellular-standards-based approach of consulting the Home Location Register (HLR) of the mobile. A simplified version of the cellular standards approach to location management is depicted in FIG. 6. Assume, for example, that endpoint A has a need for a connection to mobile B. When endpoint A located in network X sends a call setup request for a connection to mobile B to switch 1, then switch 1, which is connected to endpoint A, must first determine the location of mobile B before the connection setup can be initiated. To enable this mobile location operation, each mobile is assigned a home switch with an attached HLR which tracks the current location of the mobile. When a mobile moves between switches it informs its respective HLR of its new location which is recorded in the HLR database. Therefore, to locate mobile B, switch 1 first sends a location request message, LOCREQ, to the HLR associated with mobile B and obtains a response indicating, for example, that switch 3 is the current location of mobile B. Switch 1 may then send a set-up message for mobile B towards switch 3 which then completes the call to the destination mobile. Setting up a connection between switch 1 and the HLR in order to transport these two short messages, LOCREQ and its response, is apparently wasteful and leads to large latencies in call setup, which is addressed by the above described datagram transport technique.

In the foregoing example, the calling party's switch is assumed to know the ATM NSAP address of the HLR of the called mobile. In current cellular networks, this is achieved easily since telephony networks use geographical addressing. In private ATM networks, the ATM NSAP address of the HLR is not known. Hence, we propose a method in which the mobile's "home" ATM NSAP address is used to route the LOCREQ to a node which can issue a response with the current location of the mobile. In PNNI-based networks, "reachability" data is propagated through PTSPs (PNNI Topology State Packets). A mobile's "home" "reachability" is propagated through this mechanism of sending summarized "reachability" data. The LOCREQ is generated as a CL-ATM packet with the Destination NSAP address set to that of the mobile's home address. This indicates that it will be routed to the home switch of the mobile. If the mobile is not located at its home, this CL-ATM packet cannot be delivered.

To address this need, a proxy process is created in the home switch of the mobile for the purpose of tracking the mobile's current location. The proxy can be addressed using the mobile's home NSAP address and a well-known subaddress (or port). In effect, this is an HLR implementation using multiple small proxy processes, one assigned to each mobile that the HLR is required to track. When the LOCREQ CL-ATM packet reaches the home switch of the mobile endpoint, it delivers the packet to the corresponding proxy process. The latter generates a response indicating the current location of the mobile. Even if the mobile is located at its home, it is preferable that the proxy responds to the LOCREQ to avoid messaging over the air interface. Thus, the CL-ATM solution can be used to transport the LOCREQ to the appropriate node and obtain a response.

Figure 7:
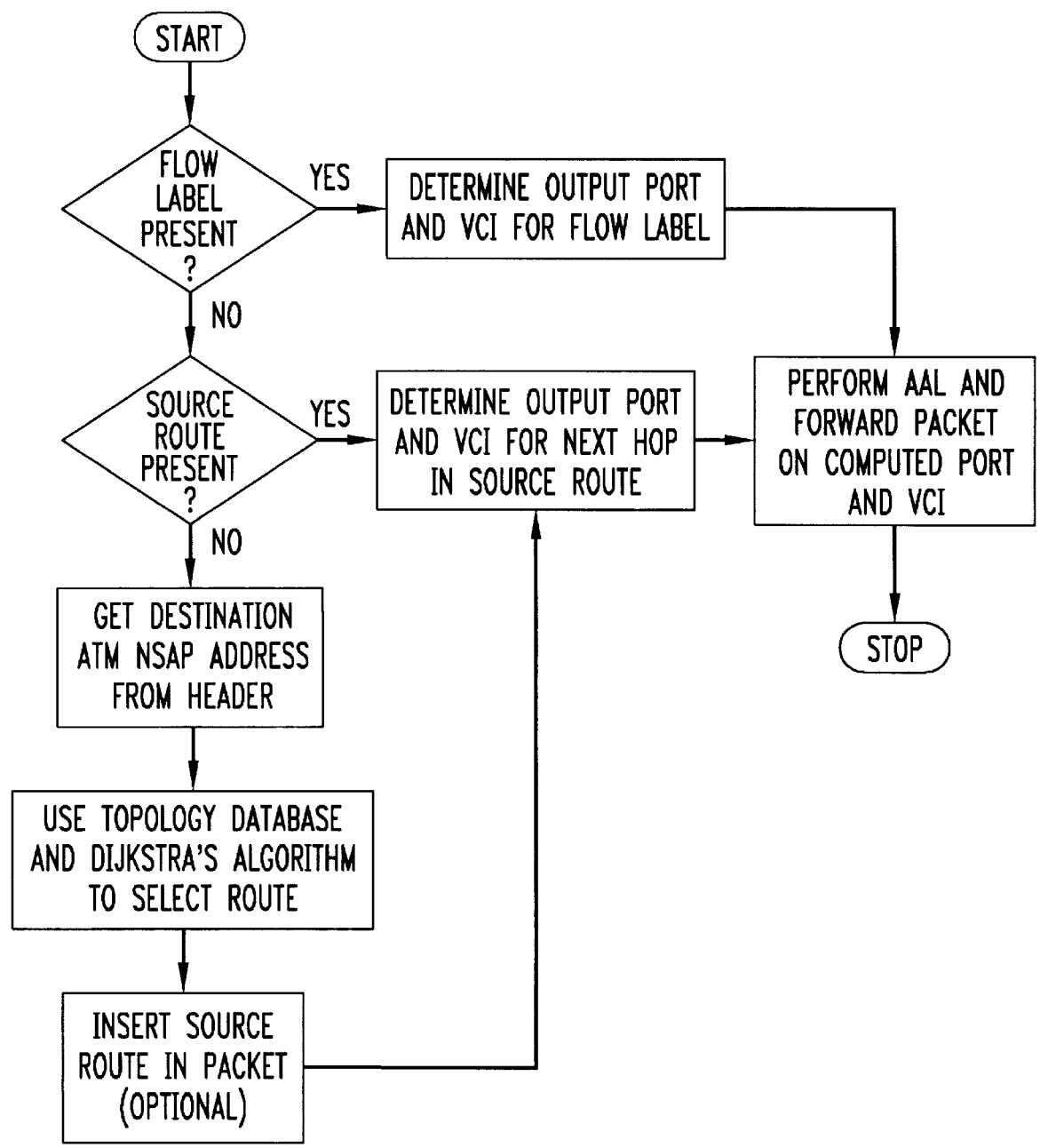
FIG. 7 illustrates in flow chart form the program which implements the principles of the invention in an ATM router of FIG. 1.

FIG. 7 illustrates in flow chart form the program which implements the invention at the CL-ATM layer that runs on the CL-ATM server of an ATM router. It is apparent from FIG. 7 that the various blocks forming the program were discussed above in detail. Since that is clearly the case, then, for the sake of clarity and brevity a discussion of FIG. 7 will not be repeated here.

The foregoing is merely illustrative of the principles of the invention. Those skilled in the art will be able to devise numerous arrangements, which, although not explicitly shown or described herein, nevertheless embody those principles that are within the spirit and scope of the invention. For example, a mechanism other than flag may be used to determine the manner in which data is to be transported to a destination, i.e., via connection oriented service or connectionless service. Such a mechanism could examine the payload and specify connection oriented or connectionless service based on whether or not the payload is substantial. Additionally, if the mechanism finds that a series, e.g., more than two, packets are being sent to the same destination, then the mechanism could specify connection oriented service. Alternatively, even if the application specifies a connectionless service, the CL-ATM software could be arranged to detect long data flows and then request a connection, thereby causing the system to switch from connectionless service to connection oriented service.

As another example, information describing the topology of a network including routing information could be loaded in the network topology database of FIG. 1 to eliminate the need to run the aforementioned Dijkstra algorithm and/or the NT software, thereby enhancing the processing of a packet at the CL-ATM protocol layer. The source of such information could be a network administrator. As a further example, the AAL5 layer described above may be readily replaced by a different type of ATM adaptation layer.

We claim:

1. A method of operating an Asynchronous Transport Mode (ATM) switch comprising the steps of responsive to receiving a first data cell associated with connection oriented services, forwarding the cell to its intended destination via a switched virtual circuit previously established for the cell, and responsive to receiving, over a channel associated with connectionless services, a second data cell containing a predetermined virtual channel identifier common to connectionless service, performing a router function to determine a route from the ATM switch to the intended destination of the second data cell and forwarding the second data cell over a portion of the determined route.

2. The method set forth in claim 1 further comprising the steps of accumulating a series of received cells bearing said common identifier and addressed to said destination to form a datagram, inserting said determined route in said datagram and segmenting said datagram into a sequence of data cells each containing a header, and forwarding, in turn, each of said sequence of data cells over the determined route to a next ATM switch.

3. The method set forth in claim 1 further comprising the steps of provisioning a database containing information characterizing the topology of an associated ATM network, and using such information to determine said route.

4. The method of claim 3 wherein said topology information identifies each ATM switch forming said network, links interconnecting one ATM switch with another ATM switch and a level of congestion at an ATM switch.

5. An Asynchronous Transport Mode (ATM) router comprising apparatus, responsive to receiving a data packet from a source, for segmenting said data packet into ATM data cells and appending a header to each such data cell, and apparatus, responsive to said packet containing a first identifier indicative of connectionless service, for determining a route which may be used to forward each of the data cells to an intended destination and forwarding each of the data cells in sequence over the determined route, and responsive to an absence of said first identifier, forwarding each of the data cells in sequence over a previously defined switched virtual circuit.

6. The ATM router set forth in claim 5 further comprising a database containing information characterizing the topology of an associated ATM network, and wherein said apparatus for determining said route uses such information to determine said route.

7. The ATM router of claim 6 wherein said topology information identifies each ATM switch forming said network, links interconnecting one ATM switch with another ATM switch and a level of congestion at an ATM switch.

8. The ATM router of claim 5 further comprising apparatus for appending said determined route to said packet before it is segmented into said sequence of ATM cells, and wherein a next ATM switch receiving said sequence of ATM cells reconstructs said data packet to identify said determined route and then forwards said data packet as a sequence of data cells over the identified route.

9. The ATM router of claim 5 further comprising apparatus for appending said determined route to said packet before it is segmented into said sequence of ATM cells, and wherein a next ATM switch receiving said sequence of ATM cells reconstructs said data packet from the received sequence of ATM cells to obtain said route from said next ATM switch to the intended destination, segments the reconstructed data packet into a next sequence of ATM cells and forwards the next sequence of ATM cells in turn over the obtained rout.

10. An Asynchronous Transport Mode (ATM) router comprising apparatus, responsive to receiving a first data cell associated with connection oriented service, for forwarding the cell to its intended destination via a switched virtual circuit previously established for the cell, and, responsive to receiving a first one of a series of data cells containing a virtual path identifier common to connectionless service, for storing said first data cell in a buffer, apparatus, responsive to receipt of a last one of said series of data cells containing said common identifier and addressed to the same destination, for forming the series of data cells into a data packet, for determining a route that may be used to forward the data packet to its intended destination, and for appending the determined route to said data packet, and apparatus, responsive to the formation of the said data packet, for the data packet into a sequence of data cells each having a header containing said common virtual path identifier and forwarding the sequence of data cells in turn to the intended destination over the determined route.

11. An Asynchronous Transport Mode (ATM) router comprising apparatus, responsive to receiving a data cell associated with connectionless service, for storing said data cell in a buffer associated with a destination identified in the received data cell, apparatus, responsive to receipt of a last one of a series of such data cells addressed to the same destination, for storing each of the cells in said buffer and forming a data packet from the stored series of data cells, for determining a route that may be used to forward the formed data packet to its intended destination, and for appending the determined route to the formed packet, and apparatus, responsive to the formation of the said packet, for segmenting the formed data packet into a sequence of data cells, associating each such data cell with connectionless service, and forwarding the sequence of data cells in turn to the intended destination over the determined route.

12. An Asynchronous Transport Mode (ATM) router comprising an accumulator for accumulating a series of received cells each bearing a common identifier and addressed to the same destination, a processor for forming a datagram from the accumulated series of received cells, for inserting a determined route in said datagram and for segmenting said datagram into a sequence of data cells each containing a header, and forwarding, in turn, each of said segmented data cells over the determined route to a next ATM switch.

13. A router for interfacing a packet constructed in accordance with the Internet Protocol (IP) with an Asynchronous Transport Mode (ATM) network comprising apparatus, responsive to receipt of an IP packet, for converting an IP destination address contained in the IP packet into an ATM network-service-access-point (NSAP) address, and apparatus for determining a route that may be used to forward the packet to a destination associated with the ATM NSAP address, for assembling at least a payload portion of the packet and the ATM NSAP address into a series of ATM data cells, for associating each of the series of data cells with ATM connectionless service and for forwarding in turn the series of ATM series to the destination over the determined route.

14. The router of claim 13 wherein said determined route is appended to the payload portion before the payload portion and NSAP address are so assembled.

15. A host switch for interfacing a packet constructed in accordance with the Internet Protocol (IP) with an Asynchronous Transport Mode (ATM) network comprising apparatus, responsive to receipt of an IP packet containing a domain name associated with a destination point, for converting the domain name into an ATM network-service-access-point (NSAP) address, and apparatus for assembling at least a payload portion of the packet and the NSAP address into a series of ATM data cells, for associating each of the series of data cells with ATM connectionless service and for forwarding in turn the series of ATM data cells to the destination point over the determined route.

16. A method of processing a third-party call set up request in an Asynchronous Transport Mode (ATM) switch comprising the steps of responsive to receiving a request for a third-party connection, forming the request into a series of data cells each containing a virtual path/channel identifier common to connectionless service, and responsive to each such data cell, identifying a route that may be used to forward each of the data cells to an end point of the requested connection and forwarding the data cell to that end point.

17. Apparatus including a home location register for tracking a plurality of mobile stations comprising a processor communicating with an ATM switch, and a set of proxy processes running on said processor and associated with respective ones of the mobile stations for tracking the locations of said mobile stations, each of said proxy processes being identified by an ATM network service access point address assigned to a respective one of the mobile stations.

18. A method of tracking a plurality of mobile stations using a home location register comprising the steps of arranging a processor so that it communicates with an ATM switch, and running a set or proxy processes on said processor, said proxy processes being associated with respective ones of the mobile stations to track the locations of said mobile stations, each of said proxy processes being identified by an ATM network service access point address assigned to a respective one of the mobile stations.

19. The method of claim 18 further comprising the steps of forming a message requesting the location of one of the mobile stations, inserting a destination address of said one mobile station in said message, and forwarding the message as a plurality of data cells to an ATM router, responsive to each such data cell, identifying a route that may be used to forward the data cell to the destination address and forwarding the data cell to that destination, and at said destination, determining the location of said one mobile by accessing the proxy process associated with that mobile and returning the determined location to the source of said message.

* * * * *